United States Patent [19]

Bono et al.

[11] Patent Number: 5,215,328
[45] Date of Patent: Jun. 1, 1993

[54] TORSION SUSPENSION FOR A SINGLE AXLE

[76] Inventors: Mark J. Bono, 286 Donaldson Dr., Munroe Falls, Ohio 44262; John A. Haggerty, 3145 Shellhart Rd., Norton, Ohio 44302; Roy L. Orndorff, Jr., 7827 Birchwood Dr., Kent, Ohio 44240

[21] Appl. No.: 663,228

[22] Filed: Mar. 1, 1991

[51] Int. Cl.[5] ............................................. B60G 11/20
[52] U.S. Cl. .................................... 280/717; 280/721; 267/279
[58] Field of Search ............... 280/721, 723, 688, 717; 267/273, 276, 279, 280, 281

[56] References Cited

U.S. PATENT DOCUMENTS

| | | | |
|---|---|---|---|
| 2,330,482 | 9/1943 | Fageol | 267/276 |
| 2,345,201 | 3/1944 | Krotz | 267/181 |
| 2,621,923 | 12/1952 | Krotz | 267/181 |
| 3,770,291 | 11/1973 | Kramer | 280/721 |
| 4,097,057 | 6/1978 | Goodrich, Jr. et al. | 267/280 |
| 4,738,467 | 4/1988 | Orndorff | 280/721 |
| 4,778,199 | 10/1988 | Haggerty | 280/721 |
| 4,842,298 | 6/1989 | Jarvis | 267/188 |

FOREIGN PATENT DOCUMENTS 1556171  11/1979  United Kingdom ............... 267/276

Primary Examiner—Karin L. Tyson

[57] ABSTRACT

A suspension system for a vehicle having a torsion spring interconnecting the wheels and axle to spaced portions of the frame via suspension arms wherein each suspension arm has one end secured to one element of the torsion spring and its other end connected to one end portion of a torsion type shackle. The other end of the shackle has its outer shell connected to the vehicle frame via replaceable shims that adjust the height of the vehicle frame relative to the axle and the ground.

5 Claims, 4 Drawing Sheets

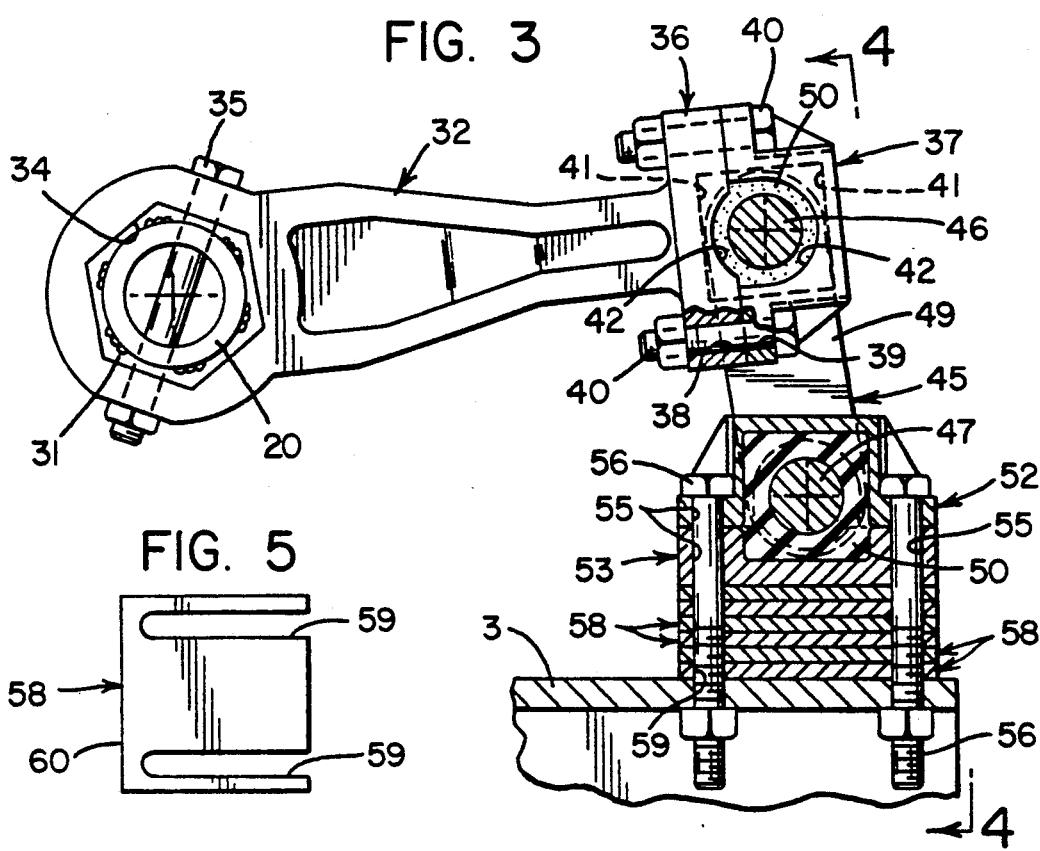
FIG. 3
FIG. 5
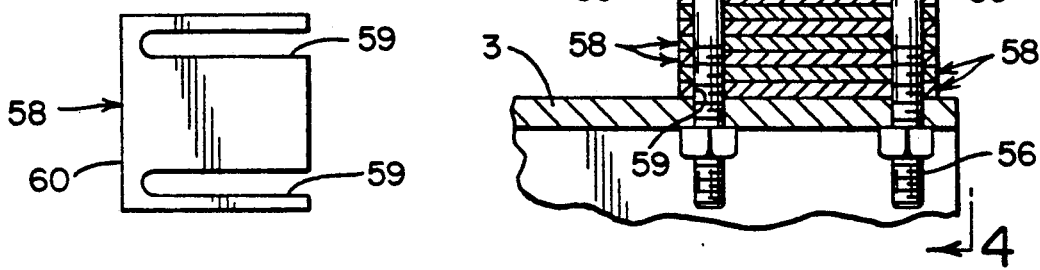
FIG. 4
FIG. 6

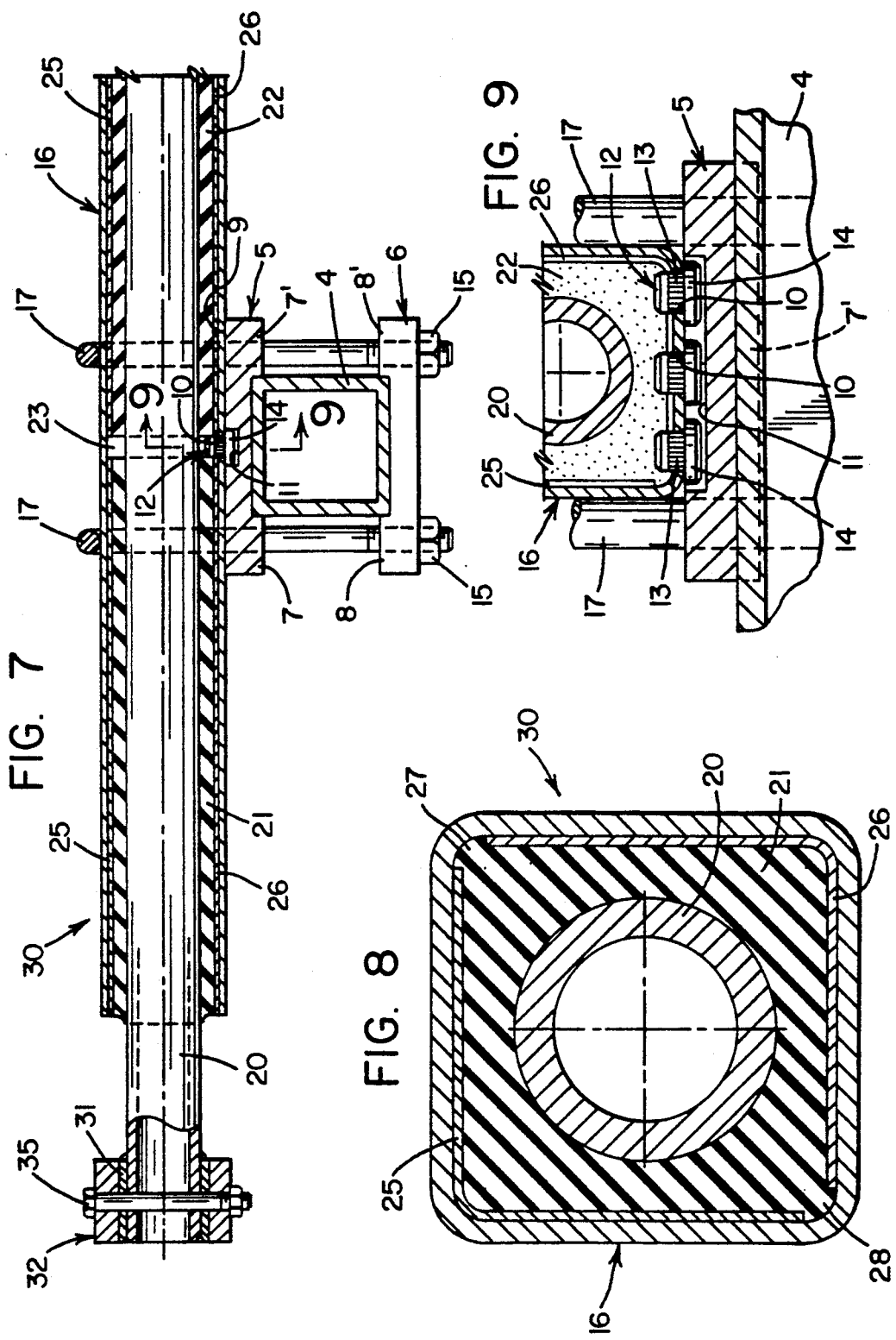

5,215,328

TORSION SUSPENSION FOR A SINGLE AXLE

BACKGROUND OF THE INVENTION

The present invention relates to a suspension system for a vehicle and more particularly to a new and improved torsion suspension system.

Various types of suspension systems have been proposed and used for vehicles in attempts to improve ride characteristics under varying conditions of loading. It is particularly difficult to provide a suspension system that is good for loaded conditions as well as for empty conditions. Various mechanical expedients have been tried including a variable rate leaf spring but such suspension system provides a harsh ride when the vehicle is empty or lightly loaded. Another expedient has been air springs; however, because of their inherent lack of stability, their use requires complicated systems of stabilizers and are not readily adaptable to most vehicle bodies. The present invention is directed to a suspension system that employs a unique combination of torsion springs that enhance and increase ride quality, vehicle stability and spring durability. With the unique construction design of the present invention, the elastomeric member and its interacting supporting structures cooperate in a novel manner, enhancing performance and maintenance in a cost-effective way as the suspension system eliminates the need for bushings, bearings or the need for an external power source as used in air bags. By eliminating these components and simplifying the overall suspension design, there is a very low maintenance requirement. Further, the designed suspension eliminates the need for any welding of the assembled components to thereby eliminate any problems previously encountered in fatigue life of the elastomers and to further reduce cost of the finished and the assembled system. The design of the present suspension system provides a simplified structure for leveling the suspension system and to compensate for rubber creep where such problems arise.

The suspension spring and its outboard attachment significantly reduces sway or roll. Since the vehicle is completely cradled in rubber, there is a significant decrease in chasis vibration and noise which, in combination with sway and roll control, affect ride quality. These factors improve the driver's maneuverability and control while increasing passenger comfort.

SUMMARY OF THE INVENTION

The present invention contemplates a vehicle having a support frame and at least a pair of wheels journaled on an axle with a torsion suspension system interconnecting such axle to the frame. A longitudinally extending polygonally shaped housing in cross-section is secured to the axle and supports a longitudinally extending shaft that is encompassed by and secured to an elastomeric member, which member has an outer periphery that is polygonally contoured to be retained within the housing to define a primary torsion spring. The shaft in turn has its respective ends suitably connected to one end portion of a shackle, which shackle has its other end portion connected to a shell that is adjustably connected to the frame via removable shim members. The shackle has its respective end portions encased in elastomeric members to provide a torsional reactive force to aid the primary torsion spring.

BRIEF DESCRIPTION OF THE DRAWINGS

FIG. 3 is an enlarged side elevational view partly in section of a suspension arm connected to the vehicle frame taken on line 3—3 of FIG. 2;

FIG. 4 is a front elevational view of the suspension arm taken on line 4—4 of FIG. 3, with a portion of the shell halves broken away;

FIG. 5 is a plan view of a shim plate;

FIG. 6 is a perspective view of a shell half;

FIG. 7 is a side elevational view of a portion of the torsion string taken on line 7—7 of FIG. 2;

FIG. 8 is a cross sectional view of the torsion spring taken on line 8—8 of FIG. 2;

FIG. 9 is a cross sectional view of torsion spring taken on line 9—9 of FIG. 7.

DETAILED DESCRIPTION

Figure 1:
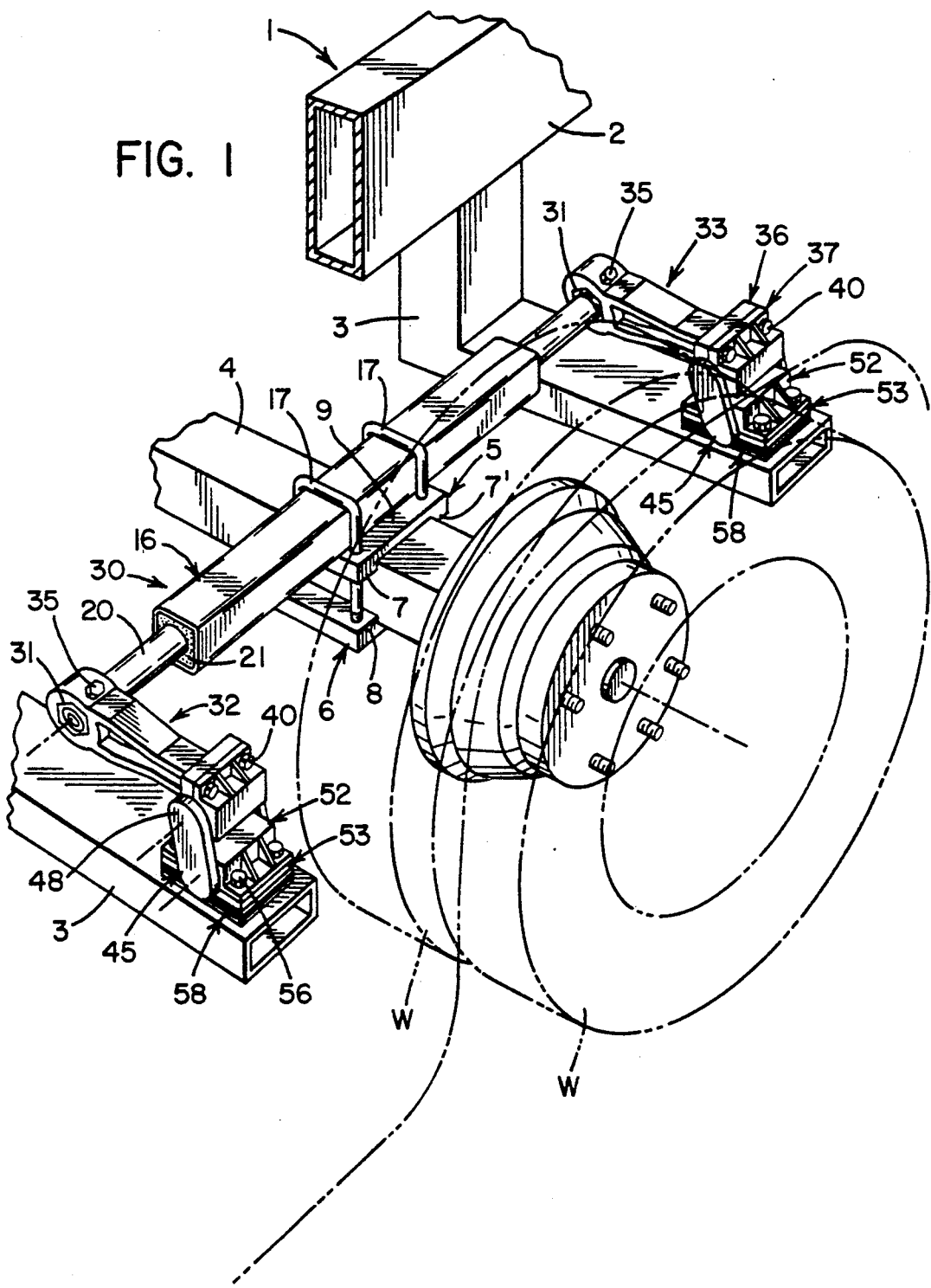
FIG. 1 is perspective view of a portion of a vehicle suspension system in accordance with and embodying the invention.
Figure 2:
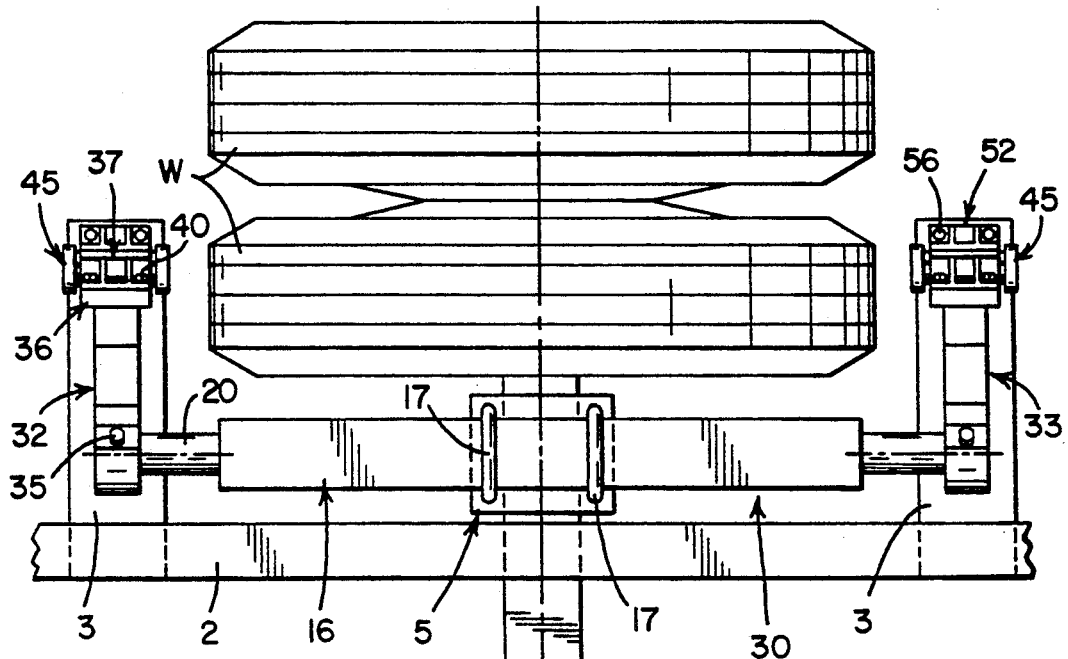
FIG. 2 is a plan view of the vehicle suspension system.
Figure 2:
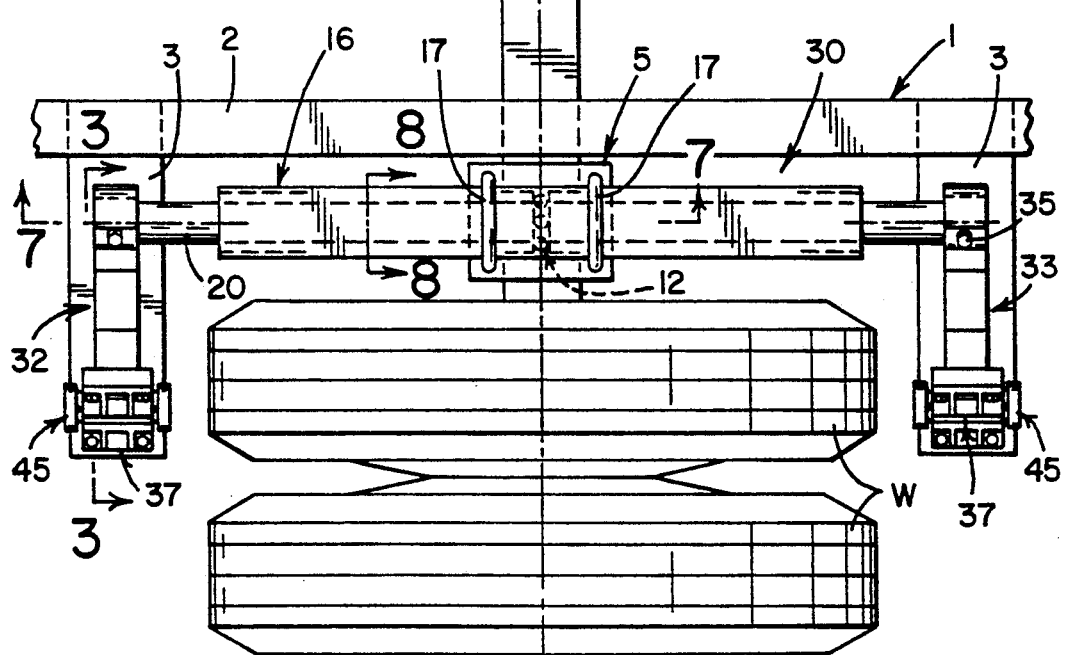

Referring now to the drawings, wherein like-reference numerals designate like or corresponding parts throughout the several views, there is known in FIG. 2 a vehicle frame 1 having longitudinal extending frame members 2 and L-shaped transverse frame members 3 extending therefrom. Wheels W are suitably attached at each end of a tubular axle 4, as shown in FIG. 2.

Each end of the tubular axle 4 adjacent to the wheels W has a pair of vertically spaced square shaped pads or axle brackets 5 and 6 suitably attached as by clamping or bolting to the axle 4. The upper axle bracket 5 is generally square shaped with a pair of projections 7 and 7' depending therefrom to engage the upper side edges of the tubular axle 4 (FIG. 7) while the lower axle bracket 6 is generally square shaped with a pair of projections 8 and 8' extending vertically upwardly therefrom to engage the lower side edges of the tubular axle 4. Thus, axle brackets 5 and 6 provides the means for locking in the axle 4 therebetween. The upper or outer surface 9 of pad or axle bracket 5 is flat or planar to facilitate a broad surface contact between such surface 9 and a hollow housing or shell 16. The respective vertically aligned axle brackets 5 and 6 have bores therethrough at their respective corners.

The hollow housing or shell 16 is a longitudinally extending member that is square in cross section and is rigidly attached to the tubular axle 4 by U-bolts 17. The respective leg portions of the U-shaped bolts 17 pass through the respective aligned bores of axle brackets 5 and 6 with nuts 15 suitably attached to the respective threaded end portions of the legs of U-shaped bolts 17.

Housing 16 has a plurality of bores 10 (FIG. 9) that extend through the bottom wall thereof and are located along the mid-point or center portion of the longitudinal length of such housing 16. The upper axle bracket or pad 5 has a longitudinal recess 11 along its outer surface 9, which recess 11 will be in alignment with the bores 10 when upper axle bracket or pad 5 is located at the mid point of the longitudinally extending housing 16. A locking pin or pin 12 with a knurled upper portion 13 and a lower flanged portion 14 is located in each bore 10 of the housing 16 such that such knurled portion 13 frictionally engages the side edges of the wall in the bores 10 of housing 16 while the enlarged circular flanged portion or head 14 is received by the recess 11 in upper axle bracket or pad 5. The diameter of the flanged portion or head 14 is substantially equal in dimension to the width of recess 11 to thereby lock the housing 16 to the axle brackets or pads 5 and 6 as well as axle 4, thereby preventing relative movement of housing 16 transversely to axle 4 once such housing 16 is fastened to the axle bracket 5 by U-bolts 17.

Located within housing 16 is a longitudinally extending cylindrical support beam or shaft 20. The entire shaft 20 is round to provide a low cost economical base for construction and replacement. A pair of axially aligned elastomeric members 21 and 22 are bonded to the outer periphery of the shaft 20, leaving a small gap 23 between adjacent ends of the elastomeric members 21 and 22 for a purpose to be described. The outer periphery of the respective elastomeric members 21 and 22 are square shaped in configuration while its inner periphery is round to mate with shaft 20. Each elastomeric member 21 and 22 has a pair of longitudinally extending angular plate members 25 and 26, secured to the outside peripheries thereof. This may be achieved during the molding process of the elastomeric members, leaving a pair of spaced longitudinally-extending gaps 27 and 28 between the respective side edges of the adjacent plate members 25 and 26 which allows the elastomeric material to fill these gaps as shown in FIG. 8. This configuration of the plate members and the gap therebetween allows the compression of members 25 and 26 toward each other which action also compresses the elastomeric members 21 and 22 therebetween and allows the introduction of the plate members 25 and 26 and the elastomeric members 21 and 22 into the hollow portion of square shaped shell or housing 16. Such action places the elastomeric members 21 and 22 under compression. The shell 16, along with plate members 25 and 26, elastomeric members 21 and 22, and shaft 20 define a primary torsion spring 30 (FIG. 8) under compression. The protruding ends of pins 12 fit (FIG. 7) between the plate members 25 and 26 to prevent relative movement of the torsion spring 30 and housing 16 relative to the axle 4.

The respective ends of shaft 20 receive a connector bracket 31 (FIG. 3) which bracket 31 has a circular inner periphery and a polygonal outer periphery to facilitate its connection to suspension arms 32 and 33. The respective one ends of each suspension arm 32 and 33 have polygonal apertures 34 that receive the polygonal shaped outer periphery of bracket 31 to thus interconnect the torsion spring 30 to the spaced suspension arms 32 and 33. The connector brackets 31 may be welded to the shaft 20 prior to the molding of the elastomeric members 21 and 22 to the shaft 20 as depicted by FIG. 3. The shaft 20, brackets 31 and each suspension arm 32 and 33 have aligned through bores that receive a bolt 35 to interconnect these described members to insure their movement together and facilitate replacement of parts. Since the respective suspension arms 32 and 33 are identical in construction and their connection to the vehicle frame, only suspension arm 32 and its connection to the vehicle frame will be described. The other end of suspension arm 32 has flanged shell half 36 integrally molded therewith for mating engagement with a second flanged shell half 37. The shell halves 36 and 37 when brought into mating engagement have aligned bores 38 and 39 respectively, which receive bolts 40 to securely fasten such shell halves 36 and 37 into a unitary shell for connection to a shackle to be described. The interior portion of each shell half 36 and 37 have a rectangular shaped recess 41 with opposite side portions having an arcuately shaped recess 42 to allow for the projection of a shaft therethrough.

A molded shackle 45 (FIGS. 3 and 4) has a pair of spaced shafts 46 and 47 that have their respective ends connected to a pair of spaced lateral support members 48 and 49. Each shaft 46 and 47 receives an elastomeric member 50 whose outer configuration is square shaped in cross section while the interior thereof encompasses the respective shafts 46 and 47. The square (in cross section) shaped outer configuration of elastomeric member 50 (in the case of shaft 46) is frictionally received by the rectangular shaped recess 41 and secured thereto by bolts 40. In the case of lower shaft 47 the elastomeric member 50 is frictionally received by shell halves 52 and 53 substantially identical to shell halves 36 and 37. The shackle 45 with its respective shafts 46, 47, elastomeric members 50, and their encompassing shell halves 36, 37 and 52, 53 form a torsion spring in compression to cooperate with the primary torsion spring 30. Shell halves 52 and 53 have aligned bores 55 at their respective corners to receive bolts 56 to provide means for securing such shell halves to the lower leg of L-shaped transverse frame member 3 which is part of the vehicle frame or support. Located between the shell half 53 and the transverse member 3 are a plurality of shim plates 58 to provide means for adjusting the vehicle height and frame relative to the ground or axle. The amount of vehicle height adjustment needed is obtained by removing an equal height amount of shim plates. The shim plate 58 is a rectangular shaped plate member with a pair of longitudinally extending slots 59 running from closely adjacent one side 60 to the side opposite side 60 to allow the placement or removal of the shim plates 58 from the height adjustment process without the removal of bolts 56. The conventional system of leveling or adjusting the height of the frame requires a complicated adjustment procedure which involves some trial and error until the desired height is achieved, which is a very time consuming process in comparison to the instant invention.

In the operation of the suspension system described, as the wheel W is moved vertically by encountering an irregular surface by the vehicle, the movement of the wheel W and axle 4 causes the housing 16 to move vertically so that shaft 20 rotates (since shaft 20 is interconnected to housing 16 via elastomeric members or sleeves 21 and 22) relative to such housing since such shaft 20 is interconnected to the support frame 1 via suspension arms 32, 33 and shackle 45. The rotation of shaft 20 relative to the housing 16 is resiliently resisted by the elastomeric members or sleeves 21 and 22. In addition to the torsional resistance of the primary torsion spring 30, the shackle 45 with its spaced shafts 46 and 47, which are encapsulated by the elastomeric members 50 and the shell halves 36, 37 and shell halves 52, 53 provide an additional resistance to the torsion forces of the suspension system as the vehicle frame 1 and frame members 3 tend to move in an up and down manner relative to wheels W as suspension arms 32 and 33 tend to pivot about the centers of shaft 20 and shafts 46, 47.

To adjust the height of the vehicle frame 1 and frame members 3 relative to the ground surface or axle 4 and wheel W, the removal of shims 58 between the transverse frame member 3 and the lower shell half 53 as depicted by FIG. 4 achieves the expedient raising of such frame members 3.

To compensate for rubber creep (which will lower the vehicle ride height) the torsion springs need periodic adjustment by the use of such shims which may be of different thicknesses. With the square spring designs as configured and designed above with pin 12 projecting into gap 23, relative movement between the molded spring and housing 16 is prevented and eliminates any welding on the assembled torsion suspension system including the spring housing 16 and the shafts. It is to be noted that after a torsion spring has been inserted into the torsion spring housing 16, any subsequent welding operations can heat up the rubber causing a reversion in the rubber and lowers its fatigue life. With the heat treated pins 12 interconnecting the axle and torsion spring housing 16, the torsion spring's life is increased and provides precise means to locate these mating parts while eliminating in a facile manner torsion spring and its housing or outer shell 16 from relative movement due to the vehicle's fore and aft movement.

Various modifications are contemplated and may obviously be resorted to by those skilled in the art without departing from the described invention, as hereinafter defined by the appended claims, as only a preferred embodiment thereof has been disclosed.

We claim:

1. A torsion suspension for a vehicle having a rigid frame, said suspension comprising at least a pair of wheels, an axle having a pair of spaced end portions, said wheels mounted on said spaced end portions of said axis, an elongated housing secured to said axis, an elongated cylindrical shaft extending through said housing, said shaft having a pair of opposite ends projecting from said housing, an elastomeric member means under compression secured to said cylindrical shaft and said housing to define with said housing and said shaft a torsion spring, the respective ends of said shaft connected to the respective one ends of a pair of elongated suspension members, a pair of spaced shackles, each shackle having a pair of spaced rods, each rod having an elastomeric pad secured thereto and encompassing said rod, the other end of each of said suspension members secured to and encompassing one of said elastomeric pads of each shackle, a shell member encompassing the other one of each of said elastomeric pads and secured to said rigid frame, and height adjusting means interposed between each of said shell members and said rigid frame to adjust the height of said rigid frame relative to said axle as well as such rigid frame relative to the ground supporting such vehicle.

2. A torsion suspension as set forth in claim 1 wherein said height adjusting means are a plurality of shims which position and locate each of said shell members relative to said rigid frame.

3. A torsion suspension as set forth in claim 2 wherein each of said elastomeric pads have a polygonal outer configuration.

4. A torsion suspension for a vehicle having a rigid frame, said suspension comprising at least a pair of wheels, an axle having a pair of spaced end portions, said wheels mounted on said spaced end portions of said axle, an elongated housing secured to said axle, an elongated cylindrical shaft extending through said housing, said shaft having a pair of opposite ends projecting from said housing, an elastomeric member means under compression secured to said cylindrical shaft and said housing to define with said housing and said shaft a torsion spring, the respective ends of said shaft connected to the respective one ends of a pair of elongated suspension members, a pair of spaced shackles, each shackle having a pair of spaced rods, each rod having an elastomeric pad secured thereto and encompassing said rod, the other end of each of said suspension members secured to and encompassing one of said elastomeric pads of each shackle, a shell member encompassing the other one of each of said elastomeric pads and secured to said rigid frame, height adjusting means interposed between each of said shell members and said rigid frame to adjust the height of said rigid frame relative to said axle as well as such rigid frame relative to the ground supporting such vehicle, said height adjusting means are a plurality of shims which position and locate each of said shell members relative to said rigid frame, each of said elastomeric pads have a polygonal outer configuration, each of said elastomeric pads are under compression, said housing has at least a pair of bores therethrough, a mounting pad secured to said axle, said mounting pad having an elongated recess therein, mounting pins located within said recess and having projections extending into said bores in said housing to prevent axial sliding movement of said housing, said housing secured to said axle through said mounting pad, said housing is a polygonally shaped tube member, a pair of longitudinally extending L-shaped plate members mounted within said housing on opposite axial sides of said bores in said housing, said L-shaped plate members on each axial side of said bores are located between the outer periphery of said elastomeric member means and the inner periphery of said housing to facilitate the placement of said elastomeric member means under compression with said elongated shaft within said housing, said elastomeric member means comprises a pair of axially spaced elastomeric members located on opposite axial sides of said bore in said housing to define a gap therebetween, said gap is in alignment with said bores in said housing, each of said elastomeric members is bonded and secured to said shaft, each of said elastomeric members has an outer periphery that is substantially square in profile, each of said elastomeric members is encompassed by said L-shaped plate members, and said projections of said mounting pins extend into said gap to frictionally engage the end edges of a pair of adjacent ones of said L-shaped plate members that are in axial alignment and one opposite sides of said gap.

5. A torsion suspension for a vehicle having a rigid frame comprising a hollow polygonal frame member, an axle secured to said hollow frame member, an inner cylindrical shaft member disposed concentrically within said hollow frame member and having a pair of ends projecting from said hollow frame member, an elastomeric member means under compression located in said hollow frame member and engaging the entire periphery of said hollow frame member, an elongated suspension arm having a pair of spaced ends, one end of said suspension arm secured to one end of said shaft member, a shackle with a pair of spaced rods, an elastomeric member encompassing and secured to each of said rods, each of said elastomeric members have an outer polygonal cross section, the other end of said suspension arm encompassing and engaging one of said elastomeric members of said shackle, a shell member encompassing and engaging the other one of said elastomeric members of said shackle, said shell member secured to said rigid frame, and height adjusting means located between said rigid frame and said shell member operative to adjust the distance between said rigid frame relative to said axle as well as such rigid frame relative to the ground supporting such vehicle.

* * * * *

UNITED STATES PATENT AND TRADEMARK OFFICE
CERTIFICATE OF CORRECTION

PATENT NO. : 5,215,328
DATED : June 1, 1993
INVENTOR(S) : Mark J. Bono, et al

It is certified that error appears in the above-indentified patent and that said Letters Patent is hereby corrected as shown below:

On the title page, Item [73] Assignee: should read

--The B.F.Goodrich Company, Akron, Ohio--

Signed and Sealed this

First Day of March, 1994

Attest:

BRUCE LEHMAN

Attesting Officer    Commissioner of Patents and Trademarks